Patented Aug. 7, 1945

2,381,118

UNITED STATES PATENT OFFICE 2,381,118

CERTAIN ESTER-LINKED ACYLATED DERIVATIVES OF POLYAMINO ETHER ALCOHOLS AND METHOD OF MAKING SAME

Melvin De Groote, University City, and Bernhard Keiser, Webster Groves, Mo., assignors to Petrolite Corporation, Ltd., Wilmington, Del., a corporation of Delaware No Drawing. Original application June 15, 1942, Serial No. 447,160. Divided and this application August 2, 1943, Serial No. 497,127

11 Claims. (Cl. 260—404.5)

This invention relates to a new chemical product or composition of matter, our present application being a division of our pending application Serial No. 447,160, filed June 15, 1942, which subsequently matured as U. S. Patent No. 2,353,703, dated July 18, 1944.

The main object of our invention is to provide a new chemical product or compound that is particularly adapted for use as a demulsifier in the resolution of crude oil emulsions.

Another object of our invention is to provide a practicable method for manufacturing said new chemical product or compound.

Although one of the primary objects of our invention is to provide a new compound or composition of matter that is an efficient demulsifier for crude oil emulsions of the water-in-oil type, the said compound or composition of matter is adapted for use in other arts, as hereinafter indicated.

We have discovered that if one oxyalkylates glycerol so as to introduce at least three oxyalkylene radicals for each hydroxyl group, and if the product so obtained is reacted with a polybasic carboxy acid having not over eight carbon atoms, and in such a manner as to yield a fractional ester, due to the presence of at least one free carboxyl radical, one can then esterify said acidic material or intermediate product with at least one mole of an alcoholic compound of the type herein described to give a variety of new compositions of matter which have utility in various arts, and particularly in the demulsification of crude oil.

The compounds herein contemplated may be produced in any suitable manner, but are usually manufactured by following one of two general procedures. In one of said procedures the oxyalkylated glycerol, which is, in essence, a polyhydric alcohol, is reacted with a polybasic acid, so as to give an acidic material or intermediate product, which, in turn, is reacted with an alcoholic body of the kind hereinafter described, and momentarily indicated by the formula $R_1(OH)_m$. Generically, the alcoholic body herein contemplated may be considered a member of the class in which $m$ may vary from 1 to 10, although the specific significance of $m$ in the present instance will be hereinafter indicated. The second procedure is to react an alcohol of the formula type $R_1(OH)_m$ with a polybasic acid so as to produce an intermediate product, and then react said intermediate product or fractional ester with the selected oxyalkylated glycerol.

Glycerol may be conveniently indicated by the following formula:

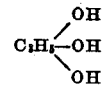

If treated with an oxyalkylating agent, and momentarily consideration will be limited to an oxyethylating agent, one may obtain an oxyethylated glycerol of the following formula:

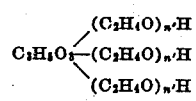

in which the value of $n'$ may vary from 3 to 10 and all the values of $n'$ need not be identical. If a polybasic carboxy acid be indicated by the formula:

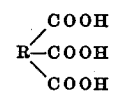

then the acyclic reaction product of one mole of oxyethylated glycerol and one mole of a polybasic carboxy acid may be indicated by the following formula:

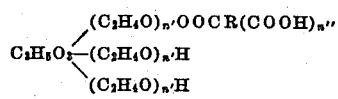

in which $n''$ has the value of one or two. Similarly, if two moles of the polybasic acid be used, then the compound may be indicated by the following formula:

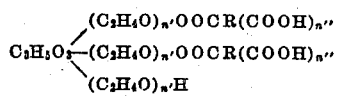

Likewise, if three moles of a polybasic acid are employed, the compound may be indicated by the following formula:

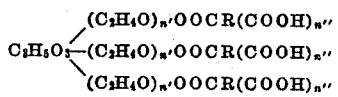

If a fractional ester of the kind exemplified by the three preceding formulae is reacted with one or more moles of an alcohol of the kind previously described in a generic sense as $R_1(OH)_m$, then obviously, one may obtain a material of the type indicated by the following formula:

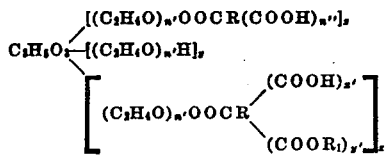

in which $x$ is 0, 1 or 2, $y$ is 0, 1 or 2, and $z$ is 1, 2 or 3, and $x'$ is 0 or 1, and $y'$ is 1 or 2.

It has been previously stated that compounds of the type herein contemplated may be obtained by oxyalkylating agents, without being limited to ethylene oxide. Suitable oxyalkylating agents include ethylene oxide, propylene oxide, butylene oxide, and glycid, which, although not included, strictly speaking, by the unitary structure $C_nH_{2n}O$, is included within the meaning of the hereto appended claims and may be simply considered as a variant of propylene oxide, i. e., hydroxypropylene oxide. Similarly, where a carboxylic hydrogen atom appears, it may be replaced by metal, an ammonium radical, or substituted ammonium radical, or by an organic group derived from an alcohol, such as an aliphatic alcohol, an aralkyl alcohol, or an alicyclic alcohol. It may also be converted into an amide, including a polyaminoamide. Thus, the preceding formula may be rewritten in its broader scope, as follows:

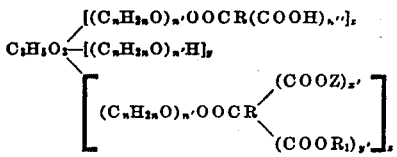

in which $n$ replaces the numbers 2, 3 or 4, $z$ includes to acidic hydrogen atom itself. In the above formula, and hereafter for convenience, $R_1$ is intended to include any hydroxyl groups that remain.

If the compounds herein contemplated are obtained under usual conditions, at the lowest temperatures, then the monomeric form is most likely to result.

The production of the compounds herein contemplated is the result of one or more esterification steps. As is well known, esterification procedures can be carried out in various manners, but generally speaking, esterifications can be carried out at the lowest feasible temperatures by using one of several procedures. One procedure is to pass an inert dried gas through the mass to be esterified, and have present at the same time a small amount of a catalyst, such as dried HCl gas, a dried sulfonic acid, or the like. Another and better procedure, in many instances, is to employ the vapors of a suitable liquid, so as to remove any water formed and condense both the vapors of the liquid employed and the water in such a manner as to trap out the water and return the liquid to the reacting vessel. This procedure is commonly employed in the arts, and for convenience, reference is made to U. S. Patent No. 2,264,759, dated December 2, 1941, to Paul C. Jones.

Referring again to the last two formulae indicating the compounds under consideration, it can be readily understood that such compounds, in numerous instances, have the property of polyfunctionality. In view of this fact, where there is at least one residual carboxyl and at least one residual hydroxyl, one would expect that under suitable conditions, instead of obtaining the monomeric compounds indicated, one would in reality obtain a polymer in the sense, for example, that polyethylene glycols represent a polymer of ethylene glycol. The term "polymer" is frequently used to indicate the polymerized product derived from a monomer in which the polymer has the same identical composition as the monomer. In the present instance, however, polymerization involves the splitting and loss of water, so that the process is essentially self-esterification. Thus, strictly speaking, the polymeric compounds are not absolutely polymers of the monomeric compounds, but since, for all practical purposes, they can be so indicated, and since such practice is common in the arts concerned with materials of this type, it is so adopted here. Thus, reference in the appended claims to polymers is intended to include the self-esterification products of the monomeric compounds.

In view of what has been said, and in view of the recognized hydrophile properties of the recurring oxyalkylene linkages, particularly the oxyethylene linkage, it is apparent that the materials herein contemplated may vary from compounds which are clearly water-soluble through self-emulsifying oils, to materials which are balsam-like and sub-resinous or semi-resinous in nature. The compounds may vary from monomers to polymers, in which the unitary structure appears a number of times, for instance, 10 or 12 times. It is to be noted that true resins, i. e., truly insoluble materials of a hard plastic nature, are not herein included. In other words, the polymerized compounds are soluble to a fairly definite extent, for instance, at least 5% in some solvents, such as water, alcohol, benzene, dichloroethyl ether, acetone, cresylic acid, acetic acid, ethyl acetate, dioxane, or the like. This is simply another way of stating that the polymerized product contemplated must be of the sub-resinous type, which is commonly referred to as an A resin, or a B resin, as distinguished from a C resin, which is a highly infusible, insoluble resin (see Ellis, Chemistry of Synthetic Resins (1935), pages 862, et seq.).

Reviewing the form as presented, it is obvious that one may obtain compounds within the scope disclosed, which contain neither a free hydroxyl nor a free carboxyl group, and one may also obtain a compound of the type in which there is present at least one free carboxyl, or at least, one free hydroxyl, or both. The word "polar" has sometimes been used in the arts in this particular sense to indicate the presence of at least one free hydroxyl group, or at least, one free carboxyl group, or both. In the case of the free carboxyl group, the carboxylic hydrogen atom, may of course, be replaced by any ionizable hydrogen atom equivalent, such, for example, as a metal, an ammonium radical, a substituted ammonium radical, etc. In the hereto appended claims the word "polar" is used in this specific sense.

We are aware that compounds similar to those contemplated in the present instance may be derived from polyhydroxylated compounds having more than three hydroxyl groups. For instance, they may be derived from acyclic diglycerol, triglycerol, tetraglycerol, mixed polyglycerols, mannitol, sorbitol, various hexitols, dulcitol, pentaerythritol, sorbitan, mannitan, dipentaerythritol monoether, and other similar compounds. Such particular types in which higher hydroxylated materials are subjected to oxyalkylation and then employed in the same manner as oxyalkylated glycerol, is employed in the present instance, are not contemplated in this specific case, although attention is directed to the same.

Reference is also made to other oxyalkylated compounds which may be used as reactants to replace oxyalkylated glycerol, or oxyalkylated ethylene glycol, which latter reactant is described in an application hereinafter referred to, to wit, Serial No. 401,376, filed July 7, 1941, which subsequently matured as U. S. Patent No. 2,324,488, dated July 20, 1943. The reactants thus contemplated include the type in which there is an amino or amido nitrogen atom, particularly, when present in a low molal type of compound prior to oxyalkylation, reference being made to polyhydroxylated materials, including those having two or three hydroxyl groups, as well as those having more than three hydroxyl groups. For instance, the oxyalkylated derivatives, particularly the oxyethylated derivatives of ethyldiethanolamine, bis-(hydroxyethyl)acetamide, the acetamide of tris-(hydroxymethyl aminomethane, tetrahydroxylated ethylene diamine, etc. Compounds may also be derived from cyclic diglycerol and the like.

Furthermore, for convenience, attention is directed to a somewhat similar class of materials which are described in our application Serial No. 401,376, filed July 7, 1941, which subsequently matured as U. S. Patent No. 2,324,448, dated July 20, 1943. Said application involves the use of the same type of alcoholic bodies for reactants, but is limited, among other things, to the compounds which are essentially symmetrical in nature, for instance, involving the introduction of two alcoholic residues, whereas, in the present instance, one, two, or three, or more, might be introduced.

As indicated previously, the polybasic acids employed are limited to the type having not more than 8 carbon atoms, for example, oxalic, malonic, succinic, glutaric, adipic, maleic, and phthalic. Similarly, one may employ acids such as fumaric, glutaconic, and various others, such as citric, malic, tartaric, and the like. The selection of the particular tribasic or dibasic acid employed, is usually concerned largely with the convenience of manufacture of the finished ester, and also the price of the reactants. Generally speaking, phthalic acid or anhydride tends to produce resinous materials, and greater care must be employed if the ultimate or final product be of a sub-resinous type. Specifically, the preferred type of polybasic acid is such as to contain six carbon atoms or less. Generally speaking, the higher the temperature employed, the easier it is to obtain large yields of esterified product, although polymerization may be stimulated. Oxalic acid may be comparatively cheap, but it decomposes readily at slightly above the boiling point of water. For this reason it is more desirable to use an acid which is more resistant to pyrolysis. Similarly, when a polybasic acid is available in the form of an anhydride, such anhydride is apt to produce the ester with greater ease than the acid itself. For this reason, maleic anhydride is particularly adaptable, and also, everything else considered, the cost is comparatively low on a per molar basis, even though somewhat higher on a per pound basis. Succinic acid or the anhydride has many attractive qualities of maleic anhydride, and this is also true of adipic acid. For purposes of brevity, the bulk of the examples, hereinafter illustrated, will refer to the use of maleic anhydride, although it is understood that any other suitable polybasic acid may be employed. Furthermore, reference is made to derivatives obtained by oxyethylation, although, as previously pointed out, other oxyalkylating agents may be employed.

As far as the range of oxyethylated glycerols employed as reactants is concerned, it is our preference to employ those in which approximately 15 to 24 oxyethylene groups have been introduced into a single glycerol molecule. This means that approximately 5 to 8 oxyethylene radicals have been introduced for each original hydroxyl group.

The oxyalkylation of glycerol is a well known procedure (see Example 11 of German Patent No. 605,973, dated November 22, 1934, to I. G. Farbenindustrie, A. G.). The procedure indicated in the following three examples is substantially identical with that outlined in said aforementioned German patent.

OXYETHYLATED GLYCEROL

Example 1

184 pounds of glycerol are mixed with ½%, by weight, of caustic soda solution having a specific gravity of 1.383. The caustic soda acts as a catalyst. The ethylene oxide is added in relatively small amounts, for instance, about 44 pounds at a time. The temperature employed is from 150–180° C. Generally speaking, the gauge pressure during the operation approximates 200 pounds at the maximum, and when reaction is complete, drops to zero, due to complete absorption of the ethylene oxide. When all the ethylene oxide has been absorbed and the reactants cooled, a second small portion, for instance, 44 more pounds of ethylene oxide, are added and the procedure repeated until the desired ratio of 15 pound moles of ethylene oxide to one pound mole of glycerol is obtained. This represents 660 pounds of ethylene oxide for 92 pounds of glycerol.

OXYETHYLATED GLYCEROL

Example 2

The ratio of ethylene oxide is increased to 21 pound moles for each pound mole of glycerol. Otherwise, the same procedure is followed as in Example 1, preceding.

OXYETHYLATED GLYCEROL

Example 3

The same procedure is followed as in the two previous examples, except that the ratio of ethylene oxide to glycerol is increased to 21 to 1.

OXYETHYLATED GLYCEROL MALEATE

Example 1

One pound of oxyethylated glycerol (1 to 15 ratio) prepared in the manner previously described is treated with one pound mole of maleic anhydride and heated at approximately 110° C. for approximately 30 minutes to 2 hours, with constant stirring, so as to yield a monomaleate.

OXYETHYLATED GLYCEROL MALEATE

Example 2

The same procedure is followed as in the preceding example, except that two moles of maleic anhydride are employed so as to obtain the dimaleate instead of the monomaleate.

OXYETHYLATED GLYCEROL MALEATE

Example 3

The same procedure is followed as in the two preceding examples, except that three moles of maleic anhydride are employed so as to obtain the trimaleate.

OXYETHYLATED GLYCEROL MALEATE

*Example 4*

The same procedure is employed as in the preceding examples, except that oxyethylated glycerol (ratio 1 to 18) is substituted in place of oxyethylated glycerol (ratio 1 to 15).

OXYETHYLATED GLYCEROL MALEATE

*Example 5*

The same procedure is employed as in the preceding examples, except that oxyethylated glycerol (ratio 1 to 21) is employed instead of oxyethylated glycerol (ratio 1 to 15) or (1 to 18).

Previous reference has been made to an alcoholic body which has been defined generically by the formula $R_1(OH)_m$. The sub-generic class of alcoholic compounds employed as reactants in the manufacture of the present compounds, are hydroxylated acylated aminoethers containing (a) a radical derived from a basic hydroxyaminoether, and said radical being of the kind containing at least one amino nitrogen free from attached aryl and amido-linked acyl radicals; said hydroxy aminoether radical being further characterized by the presence of at least one radical derived from a basic hydroxyamine and being attached by at least one ether linkage to at least one radical selected from the class consisting of glycerol radicals, polyglycerol radicals, glycol radicals, polyglycol radicals, basic hydroxyamine radicals, amido hydroxyamine radicals, and aryl alkanolamine radicals; said basic hydroxyaminoether radical being characterized by containing not over 60 carbon atoms; and (b) an acyl radical derived from a detergent-forming mono-carboxy acid having at least 8 carbon atoms and not more than 32 carbon atoms, said acylated aminoether being additionally characterized by the fact that said aforementioned acyl radical is a substituent for a hydrogen atom of an alcoholic hydroxyl radical.

Such hydroxyacylated aminoethers are obtained by reactions conducted in such a manner as to introduce an acyl radical derived from a monocarboxy detergent-forming acid. Such acids are characterized by having at least 8 and not more than 32 carbon atoms and are exemplified by fatty acids, naphthenic acids, abietic acids, oxidized paraffin or wax acids, or the like, or by simple modifications thereof which do not detract from the ability of the acid to combine with alkali to produce soap or soap-like materials. As to oxidized petroleum acids, see U. S. Patent No. 2,242,837, dated May 20, 1941, to Shields.

Thus, hydrogenated oleic acid, chlorinated naphthenic acid, or brominated abietic acid will form such detergent-forming bodies with the same ease as the parent materials themselves. The oxidized acids obtained by blowing or oxidation of the acids or esters, are satisfactory. Such acids have frequently been referred to collectively in the art as monocarboxy detergent-forming acids. Needless to say, the acylation need not be conducted by means of the acid itself, but may be conducted by means of any compound of the acid which contains the acid radical; for instance, an ester, an amide, an anhydride, an acyl chloride, etc.

Common polyhydric alcohols include the glycols and glycerols. These polyhydric alcohols are characterized by th ease with which two or more molecules combine with elimination of water to form polyglycols, polyglycerols, or the like. These latter compounds are sometimes referred to as ether alcohols, because the typical ether linkage, carbon-oxygen-carbon, appears at least once in such compounds. It is known that certain hydroxyamines, particularly alkanolamines containing alkanol radicals, enter into the same kind of reaction with the formation of a hydroxylated aminoether. Possibly, the commonest example of an alkanolamine is an ethanolamine, particularly diethanolamine and triethanolamee. It may be well to point out that one of the reactants of intermediate products contemplated for the new composition of matter or demulsifying agent herein described, is derived from basic compounds, i. e., compounds in which the basicity approximates that of the parent hydroxyamine. Such basic amines are characterized by the fact that there is no aryl group directly attached to an amino nitrogen group, unless there be present at least one other amino radical capable of contributing a basic quality. In other words, a hydrogen atom attached to an amino nitrogen atom may remain as such, or may be replaced by an alkyl radical, an alicyclic radical, or an aralkyl radical, or there may be present a hydroxy alkyl radical, a hydroxy alicyclic radical, or a hydroxy aralkyl radical directly attached to the amino nitrogen atom. Furthermore, such hydroxy hydrocarbon radicals may be acylated with lower aliphatic acids containing at least two carbon atoms and not more than 7 carbon atoms. Such acids include acetic acid, butyric acid, heptoic acid, etc. In the event that an amino nitrogen atom appears in which an aryl radical is directly attached to said amino nitrogen atom, as in the case of phenyl diethanolamine, then the presence of such non-basic amino nitrogen atom must be ignored and the compound must contain at least one amino nitrogen atom of a basic character elsewhere in the molecule. Other similar aryl alkanolamines, such as di-phenyl ethanolamine, naphthyldiethanolamine, phenyldipropanolamine, etc. may be used, subject to the above-mentioned provision.

In the following table of compounds, the letter T indicates an amino hydrogen atom, or any one of the substituents which have been suggested as satisfactory to replace an amino hydrogen atom. The folowing table is submitted purely by way of illustration and indicates only a small portion of the various materials which may be acylated with a detergent-forming monocarboxy acid to provide a compojent of the demulsifying agents of the kind employed in the present process:

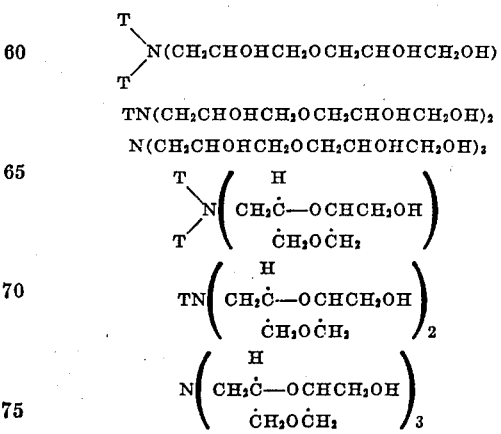

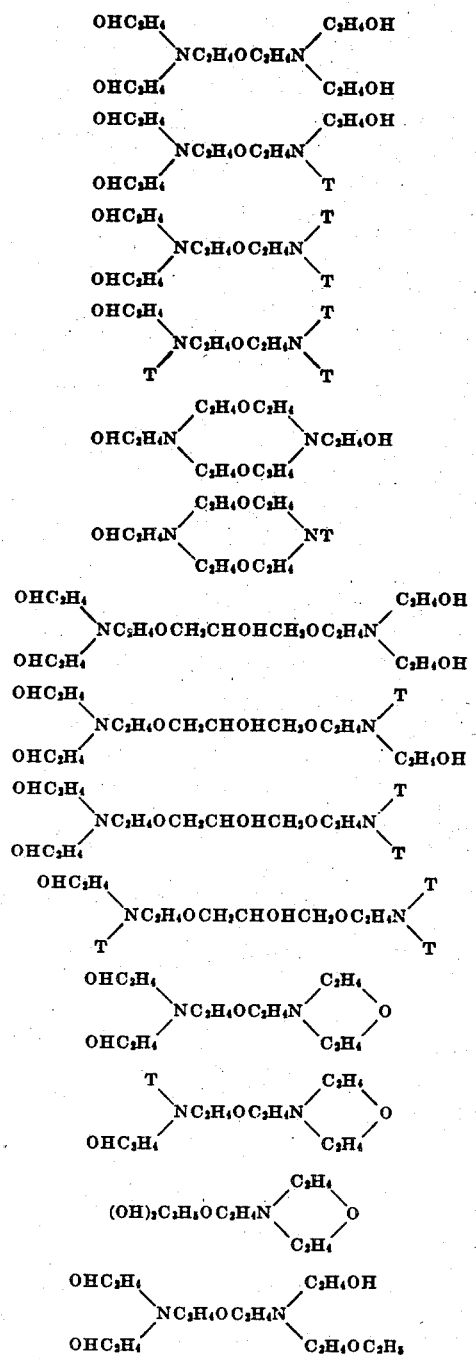

In the above table, it is understood that where the radical $C_2H_4$ occurs, it may be replaced by any other suitable radical, such as a $C_3H_6$, $C_4H_8$ radical, etc. Furthermore, it may be replaced by a residue from a cyclohexyl radical, or a residue from a benzyl radical or the like. Similarly, where the glycerol radical appears, a homologue may be substituted instead, as, for example, betamethyl glycerol or the tetrahydroxyl derivative thereof. It is unnecessary to differentiate between isomeric forms; and in some instances, one may have polymeric forms containing a large number of residues derived from polyhydric alcohols or hydroxyamines, and of such a kind that there are present perhaps 20, 30, 40, or even 50 residues from the parent material or materials which contribute to the formation of the final molecule. Continuous etherization is considered as being polymerization, for purposes of convenience. Such polymers may be considered a repetition of the monomer, taken any convenient number of times—for instance, two to twenty times. It is also to be noted that the molecule may be joined by more than one ether linkage in parallel. As previously stated, phenyl diethanolamine or similar compounds may enter into the final molecule. Similarly, morpholine or ethanol morpholine may be employed. Morpholine may be considered as contributing the basic amino nitrogen atom. In each and every instance the intermediate compound or reactant employed in the manufacture of the composition of matter or dimulsifier is characterized by having present at least one basic nitrogen atom, i. e., a nitrogen atom unattached to any aryl radical and at least one hydroxylated hydrocarbon radical generally derived from an alkanolamine, or from a glycerylamine, such as monoglycerylamine, diglycerylamine, or triglycerylamine.

As to the manufacture of such intermediate compounds, which are used as reactants to produce the new composition of matter or demulsifiers herein contemplated, one need only point out that some of them are well known compositions of matter. Others can be produced, if desired, in the same manner employed to produce those which are well known. One method of producing such compounds is to heat the desired products under suitable conditions, so as to cause dehydration to take place. Another method is to treat the selected amine with a product such as an alkylene oxide, including ethylene oxide, or with a product such as glycidol. Other methods involving dehydration in the presence of an acidic agent, for instance, dehydration of two moles of diethanolamine so as to produce the ether type compound instead of morpholine, may be employed. It is possible that some of the types indicated above, like other organic compounds, are difficult to prepare, but their derivatives can be prepared more readily. In other words, since an acylated product is desired, it is feasible, in some instances, to prepare the acylated product by uniting a partially esterified polyhydric alcohol with a partially esterified alkanolamine, or by use of an equivalent method. Thus particular method of producing the desired type of chemical compound or intermediate reactant employed in the manufacture of our new composition of matter or new demulsifier, will be discussed subsequently.

Attention is directed to the application for patent, Serial No. 273,278, of Melvin De Groote and Bernhard Keiser, filed May 13, 1939, now U. S. Patent No. 2,293,494, dated August 18, 1942. This particular patent teaches a convenient method for making some of the compounds or intermediate reactants of the kind previously indicated. The said method involves essentially the conversion of an ethanolamine or the like, such as triethanolamine, into a mono- or dialcoholate, and the reaction of the alcoholate with a halohydrin, such as glycerol chlorhydrin or glycerol dichlorhydrin. The alcoholates may be indicated by the following formulae:

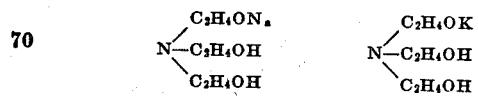

Such alcoholates react so as to liberate the alkali metal halide, such as sodium chloride or potassium chloride. Said patent illustrates, for example, the manufacture of materials of the following type of means of such reaction:

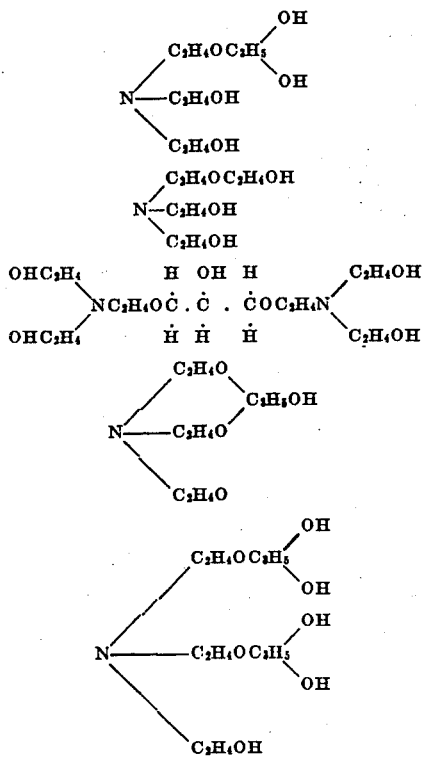

It is to be noted that the chlorhydrin involved may of itself be acylated, and thus compounds are derivable which are characterized by the presence of an acyl radical obtained from acids having either less than 8 carbon atoms, or more than 8 carbon atoms. The following excerpt is taken verbatim from said aforementioned application:

"It has been previously pointed out that one may obtain acylated derivatives of the aminoethers by use of the acylated alcoholate derived by utilization of metallic sodium or potassium or the like. In such compounds the acyl radical is attached directly to the tertiary amine residue or radical. However, if one employs an esterified chlorhydrin, i. e., the chlorhydrin derived from monoacetin, monostearin, monoabietin, mononaphthenin, or the like, one obtains a chlorhydrin of the following type:

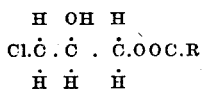

in which R.CO is the acyl radical derived from R.COOH, which represents an acid of the kind previously described. By employing such acylated halohydrin or chlorhydrin, one can use reactants which include reactions of the following composition:

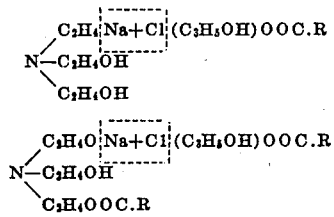

"The above reactions can only be conducted in the absence of free alkali."

The following example for preparing a hydroxy aminoether is taken verbatim from said application Serial No. 273,278 (Patent No. 2,293,494):

"100 pounds of commercial triethanolamine containing 2½% monoethanolamine and 15% diethanolamine, are treated with 135 pounds of a 60% solution of caustic soda (i. e., 80½ pounds NaOH dissolved in 53 pounds of water), so as to yield a pasty or semi-solid mass containing substantially no free or relatively little free alkali. The wet mass is then reacted with extreme care, as previously noted, with commercial glycerol monochlorhydrin. After completion of reaction, the sodium chloride formed is separated by filtration and hydraulic pressure. The final product represents a compound of technical purity and has the following composition:

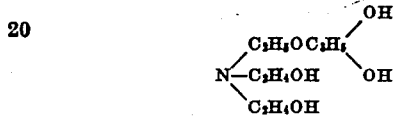

In the hereto appended claims no reference is made to the fact that the alcoholate is employed in substantial absence of alkali, because it is deemed unnecessary to indicate that this condition is the most desirable. The objection to an excess of alkali is the destruction of the chlorhydrin and the formation of a polyhydric alcohol or the like, which appears in the completed product. Naturally, there is no objection to small amounts of excess alkali whose significance is not appreciable. It is to be noted in the claims that no reference is made to separation of the alcoholate from water, excess alkali, unreacted amine, etc., which may be present, although, as previously indicated, such separatory procedure may be followed, if desired."

Having prepared a hydroxyaminoether of the kind previously described, the second step in the manufacture of the intermediate compound employed as a reactant is to acylate such product so as to introduce an acyl radical derived from a detergent-forming monocarboxy acid. For purposes of convenience, such monocarboxy acid may be indicated by the formula R'.COOH and the acyl group by R'.CO. It has already been indicated that acylation may be conducted by use of the acid itself, or by use of any suitable compound containing the acyl radical in labile form.

Attention is directed to U. S. Patents Nos. 2,154,422 and 2,154,423, to De Groote, Keiser and Blair, both dated April 18, 1939. Both of said patents are concerned with products derived by esterification between intermediate amines containing an alcoholic hydroxy group and phthalic anhydride. It is necessary in the instances described in said patents that an alcoholic hydroxyl radical be present in reaction with phthalic anhydride. Insofar that the acylated aminoethers herein contemplated as reactants for the manufacture of demulsifying agents must be esterified with maleic anhydride or the like, it is apparent that an alcoholic hydroxyl radical need be present, and that acyl radicals must be introduced so that there is a residual hydroxyl radical attached either to a hydrocarbon radical, or to an acyl radical, such as hydroxyl radical which is part of a ricinoleyl radical. Furthermore, it is apparent that even when acylation is accomplished with an acid having no hydroxyl radicals, for instance, stearic acid, oleic acid, naphthenic acid, or the like, then, in that event, one must acylate a hydroxy aminoether having more than one free hydroxyl radical. A person skilled in the art will readily understand how to employ the methods and compounds described in said two aforementioned patents to prepare acylated derivatives from hydroxy aminoethers of the kind above described and the selected detergent-forming monocarboxy acid compound.

Said patents indicate the following amines which may be employed: Diethanolamine, monoethanolamine, ethyl ethanolamine, methyl ethanolamine, propanolamine, dipropanolamine, propyl propanolamine; cyclohexanolamine, dicyclohexanolamine, cyclohexylethanolamine, cyclohexyl propanolamine, benzyl ethanolamine, benzyl propanolamine, pentanolamine, hexanolamine, octyl ethanolamine, octadecyl ethanolamine, cyclohexanol ethanolamine; triethanolamine, diethanolalkylamines, such as diethanol ethylamine, diethanol propylamine; diethanol methylamine, tripropanolamine, dipropanol methylamine, cyclohexanol diethanolamine, dicyclohexanol ethanolamine, cyclohexyl diethanolamine, dicyclohexyl ethanolamine, dicyclohexanol ethylamine, benzyl diethanolamine, dibenzyl ethanolamine, benzyl dipropanolamine, tripentanolamine, trihexanolamine, ethyl hexyl ethanolamine, octadecyl diethanolamine, polyethanolamine, mono-, di- and triglycerylamine, etc.

Attention is also directed to the two aforementioned patents to the extent that they disclose and describe various glycerylamines, and the method of manufacturing the same. Such methods obviously are applicable to derivatives of the kind previously mentioned, such as beta methyl glycerol, beta propyl glycerol, beta ethyl glycerol, etc., as well as derivatives of the tetrahydroxyl compounds obtainable therefrom.

It has been previously pointed out that the chemical compounds employed as intermediates or as reactants for the production of the composition of matter herein described need not necessarily be manufactured by first preparing the hydroxyaminoether, and subsequently acylating the same. As a matter of fact, in many instances it is more convenient to acylate the desired polyhydric alcohol or the desired hydroxyamine, and then combine the two acylated molecules or acylate one type of compound and combine with the unacylated molecule of the other type. Indeed, an examination of what has been said previously and an examination of the method suggested hereinafter, indicates that one can proceed to produce a compound in which the acylated radical derived from the detergent-forming radical is produced at whatever point is desired. In other words, it may be introduced only in one or more hydroxyamino residues which are present; or the acyl radical may be introduced only in one or more polyhydric alcohol residues which are present; or it may be introduced both into the hydroxyamino residues which are present and into the polyhydric alcohol residue which is present. As previously pointed out, if desired, the acyl radical may be introduced more than once into the same hydroxyamino residue, or into the polyhydric alcohol residue, provided there are available sufficient alcoholic hydroxyls for such combination.

Acylation, of course, is identical with esterification for the purpose of the present description. In other words, instead of replacing the hydrogen atom of a hydroxyl group by an acyl radical, one can assume that the complete hydroxyl radical has been replaced by an oxyacyl radical, i. e., a fatty acid radical; and thus, the product may be referred to as esterified. Using such nomenclature, one can refer to an alkanolamine as being particularly esterified with a selected detergent-forming monocarboxy acid or a polyhydric alcohol as being partially esterified. The manufacture of partially esterified alcohols, such as superglycerinated fats, is well known; and such compounds have considerable utility in the arts. Needless to say, the same method employed for producing superglycerinated fats, may be employed in connection with any polyhydric alcohol and may be employed in connection with other acids instead of fatty acids, for instance, the other non-fatty detergent-forming monocarboxy acids, such as abietic acid, naphthenic acid, and the like. In view of this fact, no description is necessary as to the method of preparing partially esterified polyhydric alcohols from detergent-forming acids of the kind described. Furthermore, no description is necessary as to the method of preparing partially esterified alkanolamines, in view of what has been said previously, and particularly in view of the complete description of equivalent acylation procedure, which appears in the aforementioned United States Patents Nos. 2,154,422 and 2,154,423.

Reference is made to U. S. Patent No. 2,228,989, of Melvin De Groote, Bernhard Keiser and Charles M. Blair, Jr., dated January 14, 1941. Said patent describes compounds obtainable by a method which comprises heating a partially esterfied tertiary alkanolamine with a polyhydric alcohol to a temperature in excess of 100° C. for a period of time sufficient to cause condensation with elimination of water and the production of an ethereal reaction product. Although said patent is concerned largely with derivatives of fatty acids, needless to say, the same procedure may be applied to comparable compounds derived from naphthenic acid or abietic acid of the like. This is also true in regard to the preparation of subsequent Examples 4–10, inclusive. The following three examples appear in said patent.

Example 1 (Example 1 of the patent).—"Commercial triethanolamine and cocoanut oil, in the proportions of 1 mole of cocoanut oil to 3 moles of triethanolamine are heated to a temperature between about 160° C. and 180° C. for about two hours. The resulting product consists mainly of the mono-fatty acid ester of triethanolamine, with minor proportions of the di-fatty acid ester, the tri-fatty acid ester, glycerin, etc. To this reaction product is added somewhat more than 2 moles of glycerin, and the resulting mixture is heated to a temperature between about 160° C. and 180° C. for about two days. If desired, a current of dry nitrogen or other inert gas may be passed through to speed up the reaction. Condensation occurs between the fatty acid ester of the tri-ethanolamine, and the glycerin, with the production of ethereal reaction products, such as the dihydroxypropyl ether of the mono-fatty acid ester of triethanolamine and other more complex ethereal reaction products."

Example 2 (Example 2 of the patent).—"Triglycerylamine (tri-di-hydroxy-propylamine) and castor oil are reacted in the proportions of 3 moles of castor oil to 2 moles of triglycerylamine, with the production of a product consisting predominantly of the di-ricinoleic acid ester of the triglycerlylamine. The resulting mixture is further heated for a period of about two days, with condensation between the glycerin and the di-ricinoleic acid ester of the triglycerylamine, with the production of corresponding ethereal condensation products."

*Example 3 (Example 3 of the patent).*—"Blown rapeseed oil and diethanolethylamine, in the molecular proportions of 3 moles of the amine to 1 mole of the oil are heated together to a temperature between about 150° C. and 180° C. for about two hours, with the production of a reaction product containing a large proportion of the monoester of the diethanolethylamine, together with unreacted starting material, glycerin, etc. Something in excess of two moles of glycerin are added to the reaction mixture, and the resulting product is heated to about 150° C. to 180° C. for about two days, with the production of ethereal reaction products of glycerin and the monoester of the diethanolethylamine."

Similarly, attention is called to the U. S. Patent No. 2,228,987, of Melvin De Groote, Bernhard Keiser and Charles M. Blair, Jr., dated January 14, 1941. Said patent describes compounds of the kind obtainable by a method which comprises heating the triglyceride, a tertiary alkanolamine having more than one alcoholic hydroxyl radical, and a polyhydric alcohol, to a temperature in excess of 100° C. for a period of time sufficient to cause alcoholysis of a triglyceride and condensation between the resulting partially esterified alkanolamine, and partially esterified glycerine. The following examples appear in said patent:

*Example 4 (Example 1 of the patent).*—"Commercial triethanolamine, cocoanut oil and glycerin in the proportions of one mole of cocoanut oil to three moles of triethanolamine and at least one mole of glycerin are heated to a temperature of between about 150° and 180° for a period of about fifty hours. If desired, a current of dry nitrogen may be passed through the reaction mixture. The resulting product contains a substantial and preponderating amount of the ether resulting from the condensation of the monofatty acid ester of triethanolamine and the mono- and di-fatty acid ester of glycerin, shown in the following formula:

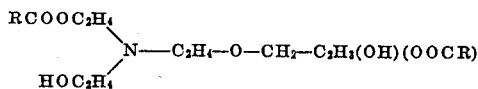

of which R represents the long carbon linked chain of the cocoanut oil fatty acids."

*Example 5 (Example 2 of the patent).*—"Triglycerylamine (tri-dihydroxy-propylamine) and castor oil are reacted in the proportions of three moles of castor oil to two moles of triglycerylamine, for a period of about two hours at a temperature of around 150° to 180° C. To the product so produced, which consists predominantly of the diricinoleic acid ester of the triglycerylamine, is added about 50% of the monoricinoleic acid ester of glycerin, and the resulting mixture is heated to about 150° to 180° C. for about two days, with the production of mixed ethers of the diricinoleic acid ester of triglycerylamine and the monoricinoleic acid ester of glycerin, of the type formula:

(RCOO)(OH)—C₃H₅O—C₃H₅(OM)—

in which two of the M's represent the acyl group corresponding to ricinoleic acid and the other three represent hydrogen, and in which R represents the carbon linked chain characteristic of ricinoleic acid."

*Example 6 (Example 3 of the patent).*—"Palm kernel oil and diethanolethylamine, in the molecular proportions of three moles of the amine to one mole of the palm kernel oil are heated together with one mole of a polyglycerol to a temperature between about 150° and 180° C. for about two days with the production of a reaction product containing a large proportion of the ether of the mono-fatty acid ester of diethanolethylamine and the monoglyceride corresponding to palm kernel oil, and a large proportion of the ether of the same diethanolethylamine ester and the mono-fatty acid ester of the polyglycerol."

*Example 7 (Example 4 of the patent).*—"An equimolecular mixture of the monoacetic acid ester of triethanolamine and the monostearic acid ester of glycerin are heated together for a period of about fifty hours, with the production of a product containing substantial amounts of the ether of the formula:

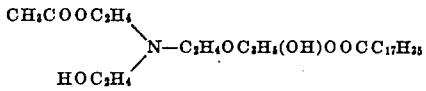

together with more complex ethereal derivatives of the amine and the monoglyceride."

*Example 8 (Example 5 of the patent).*—"Commercial triethanolamine, a fatty oil and ethylene glycol in the molecular proportions of two moles of the amine to one mole of the oil to one mole of the ethylene glycol are heated to a temperature between about 150° and 180° C. for about two days with the production of a reaction product containing substantial amounts of the ether of the monoester of triethanolamine with the corresponding monoglyceride and the ether of the monoester of triethanolamine with the monoester of ethylene glycol."

Furthermore, reference is made to U. S. Patent No. 2,228,988, of Melvin De Groote, Bernhard Keiser and Charles M. Blair, Jr., dated January 14, 1941, which describes compounds obtainable by a method which comprises heating a partially esterified tertiary alkanolamine with a tertiary alkanolamine at a temperature to an excess of 100° C. for a period of time sufficient to affect condensation with the production of an ethereal reaction product. The following examples are taken from said patent.

*Example 9 (Example 1 of the patent).*—"Commercial triethanolamine and cocoanut oil, in the proportions of 1 mole of cocoanut oil to 3 moles of triethanolamine, are heated to a temperature between about 150° C. and 180° C. for a period of about two days. If desired, a current of inert gas, such as dry nitrogen, may be passed through the reaction mixture to speed up the reaction. The resulting product consists mainly of the ether formed by the elimination of a molecule of water from two molecules of the mono-fatty acid ester of triethanolamine, with minor proportions of more complex ethers, ethers of the di-fatty acid ester of triethanolamine, ethers of the fatty acid esters of triethanolamine with glycerin or mono- or di-glycerides, etc."

*Example 10 (Example 2 of the patent).*—"The diricinoleic acid ester of triglycerylamine is heated to a temperature between about 150° C. and 180° C. for about two days, with the production of a product consisting mainly of ethers such as dihydroxypropyl, mono-hydroxypropylamine, diricinoleate ether, and more complex ethers formed by the condensation of more than two molecules of the triglycerylamine diricinoleate, etc."

*Example 11 (Example 3 of the patent).*—"Diethanolamine monoacetate is heated to a temperature between about 150° C. and 180° C. for about two days with the production of a product consisting mainly of the ether of the formula:

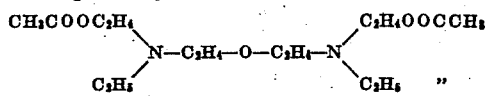

It is to be noted that reference is made to the above application for patent and the last three cited patents in regard to a further elaboration as to various fatty acid esters, i. e., ordinary vegetable oils, fats, and the like, which may be employed, and also as to further description of acceptable hydroxyamines and polyhydric alcohols which may be employed. It must be recognized that the materials have not lost their basicity to any great degree, as compared with the hydroxyamines from which they were originally derived. Esterification or acylation may tend to reduce the basicity to some degree, although in some instances it may even be increased. Such moderate changes are immaterial.

Generally speaking, it is our preference to obtain the intermediate reactants from amines in which there is no hydrogen atom attached to the amino nitrogen atom. In other words, our preference is to use tertiary amines, such as ethyl diethanolamine, diethyl ethanolamine, triethanolamine, etc. Generally speaking, it is our preference to prepare the intermediate reactants from the tertiary amines, in which there is an alkanolamine radical present, particularly an ethanolamine radical present. Furthermore, it is our preference to employ derivatives of glycerol in forming the ether type compound. Particular attention is directed to the types of compounds as prepared according to the directions in the various patents or application for patent previously referred to. Incidentally, we desire to point out that T, previously referred to, may represent an RCO radical directly attached to the amino nitrogen radical. In other words, the intermediate reactant may also be an amide. The RCO in such instances may be derived from an acid having less than 8 carbon atoms, or from a detergent-forming acid. However, in such instances the basicity of the amino radical will usually disappear in conversion into an amide; and therefore, in such instances it is usually necessary to have another amino nitrogen atom present which supplies the basicity of the molecule. Such situation is entirely analogous to the presence of an amino nitrogen atom attached to an aryl radical, as in the case of phenyl diethanolamine, previously referred to. There is no objection to any non-basic nitrogen atom contributing part of the molecular weight in the form of an arylamine radical, or in the form of an amido radical, provided that the compound still is basic, due to the presence of some other basic amino nitrogen radical of the kind previously described.

Attention is again directed to the fact that, although the preceding eleven examples are concerned largely with derivatives of unmodified fatty acids, yet the same procedure is also applicable to modified fatty acid compounds manufactured in the manner previously indicated, to wit, so that such modifications are still convertible into soap or soap-like bodies by agency of suitable alkalies. Similarly, one can prepare compounds of abietic acid, naphthenic acid, or modified forms thereof. It is not necessary to prepare the acylated aminoethers from esters; but if such procedure is desired, then one can first prepare esters from naphthenic acid, abietic acid, or the like, which correspond to naturally-occurring esters; for instance, one can prepare naphthenin, abietin, or the like. We particularly prefer to prepare compounds characterized by the presence of at least one, and preferably more than one, hydroxy hydrocarbon group in the final product. Reference is made to the fact that the table appearing in the early part of this application describing a series of representative hydroxyaminoethers, contains certain species in which the ether linkage involved combination with a monohydric alcohol. Such alcohols can vary from methyl through octadecyl, or stearyl, and may be normal or branched. In view of this fact, it must be appreciated that the scope of the compounds contemplated as intermediate reactants in the present application may be derived from hydroxyamines and monohydric alcohols, as well as hydroxyamines and dihydric alcohols, or from intermolecular reactions of two or more moles of hydroxyamines. As to the manufacture of such alkyl ethers of hydroxyalkylamines, it is to be noted that they can be manufactured by means of conventional methods now employed, or by methods which involve modification of previously described methods; or they may be manufactured by the method described in French Patent No. 832,288, dated September 23, 1938, to Zschimmer & Schwarz, Chemische Fabrik Dölau.

Having obtained such alkyl ethers of hydroxyalkylamines by the method suggested in said aforementioned French Patent No. 832,288, or by any other means, one then acylates such products in the same manner previously described. As has been pointed out previously, our preference is to use fatty acids, particularly the fatty acid compounds, such as esters, because they are readily available in the form of naturally-occurring oils and fats. Among the various desirable glycerides are: castor oil, olive oil, cottonseed oil, rapeseed oil, fish oil, menhaden oil, corn oil, cocoanut oil, palm oil, palm kernel oil, linseed oil, sunflowerseed oil, teaseed oil, neat's-foot oil, etc. Our preference is that the monomeric chemical compound, exclusive of acyl radicals, shall contain less than 60 carbon atoms, and in most instances, shall contain less than 25 carbon atoms. The acylated aminoethers used in this invention are either mono- or polyamino bodies, i. e., they contain one or more amino nitrogen atoms. In all preferred cases, they do not contain more than five such nitrogen atoms, and most preferably, they contain two or three such nitrogen atoms.

See also British Patents Nos. 337,774; 306,116; and 337,737.

COMPLETED MONOMERIC DERIVATIVE

*Example 1*

One pound mole of a tertiary ether amine of the following composition:

obtainable by the action of ethylene oxide on triethanolamine, is reacted with one pound mole of ricinoleic acid, so as to obtain the ester of the following composition:

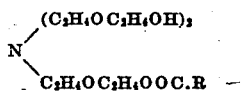

in which RCO is the ricinoleyl radical.

One pound mole of a product of the kind described under the heading "Oxyethylated glycerol maleate, Example 1" is reacted with one pound mole of a hydroxylated acylated aminoether compound, preferably in the absence of any high boiling hydrocarbon or inert solvent. However, if an inert vaporizing solvent is employed, it is generally necessary to use one which has a higher boiling range than xylene, and sometimes removal of such solvent might present a difficulty. In other instances, however, such high boiling inert vaporizing solvent, if employed, might be permitted to remain in the reacted mass and appear as a constituent or ingredient of the final product. In any event, our preference is to conduct the reaction in the absence of any such solvent and permit the reaction to proceed with the elimination of water. The temperature of reaction is about 180 to 200° C. and time of reaction about 20 hours.

COMPLETED MONOMERIC DERIVATIVE

Example 2

The same procedure is followed as in Completed monomeric derivative, Example 1, preceding, except that the dimaleate described under the heading "Oxyethylated glycerol maleate, Example 2" is used instead of the monomaleate.

COMPLETED MONOMERIC DERIVATIVE

Example 3

The same procedure is followed as in the two preceding examples, except that the trimaleate is substituted for the monomaleate or dimaleate in the two preceding examples.

COMPLETED MONOMERIC DERIVATIVE

Example 4

The same procedure is followed as in Examples 2 and 3, immediately preceding, except that for each pound mole of the maleate, or each pound mole of the trimaleate, instead of using one pound mole of ether of the kind described in Example 1, preceding, one employs two pound moles.

COMPLETED MONOMERIC DERIVATIVE

Example 5

The same procedure is followed as in Example 3, preceding, except that for each pound mole of trimaleate, instead of adding one pound mole of ether of the kind described in Example 1, preceding, one adds three pound moles of said ether.

COMPLETED MONOMERIC DERIVATIVE

Example 6

Reference to the preceding examples will show that in each and every instance oxyethylated glycerol (ratio 1 to 15) has been employed as a raw material or primary reactant. In the present instance, a more highly oxyethylated glycerol is employed, to wit, one involving the ratio of 1 to 18. (See Oxyethylated glycerol maleate, Example 4, preceding.)

COMPLETED MONOMERIC DERIVATIVE

Example 7

The same procedure is followed as in Example 6, immediately preceding, except that the oxyethylated glycerol employed represents one having an even higher degree of oxyethylation. For example, one indicated by the ratio of 1 to 21. (See Oxyethylated glycerol maleate, Example 5, preceding.)

COMPLETED MONOMERIC DERIVATIVE

Example 8

One pound mole of hydroxyethyl ethylenediamine is reacted with approximately 5 or 6 pound moles of ethylene oxide to give a diamino type hydroxylated compound. Such compound is reacted with ricinoleic acid and the acylated ether so obtained is employed in the same manner as indicated by Examples 1-7, preceding, except that such ether is used to replace the particular one described in Example 1.

COMPLETED MONOMERIC DERIVATIVE

Example 9

In the present instance the same procedure is followed as in Examples 1-7, preceding, except that instead of employing the acylated ether there described, one employs an ether obtained in the following manner: An amine of the following composition:

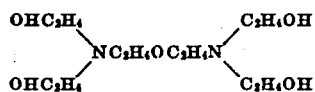

obtained by the etherization of triethanolamine or the treatment of two moles of diethanolamine with one mole of dichloroethyl ether is reacted with ricinoleic acid to give the desired acylated ether.

COMPLETED MONOMERIC DERIVATIVE

Example 10

The same procedure is followed as in Examples 1-7, preceding, except that the ether is obtained by a reaction between ricinoleic acid and an amine of the following composition:

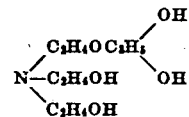

The method of producing such fractional esters is well known. The general procedure is to employ a temperature above the boiling point of water and below the pyrolytic point of the reactants. The products are mixed and stirred constantly during the heating and esterification step. If desired, an inert gas, such as dried nitrogen or dried carbon dioxide, may be passed through the mixture. Sometimes it is desirable to add an esterification catalyst, such as sulfuric acid, benzene sulfonic acid, or the like. This is the same general procedure as employed in the manufacture of ethylene glycol dihydrogen diphthalate, (See U. S. Patent No. 2,075,107, dated March 30, 1937, to Frasier).

Sometimes esterification is conducted most readily in the presence of an inert solvent, that carries away the water of esterification which may be formed, although as is readily appreciated, such water of esterification is absent when such type of reaction involves an acid anhydride, such as maleic anhydride, and a glycol. However, if water is formed, for instance, when citric acid is employed, then a solvent such as xylene may be present and employed to carry off the water formed. The mixture of xylene vapors and water vapors can be condensed so that the water is separated. The xylene is then returned to the reaction vessel for further circulation. This is a conventional and well known procedure and requires no further elaboration.

In the previous monomeric examples there is a definite tendency, in spite of precautions, at least in a number of instances, to obtain polymeric materials and certain cogeneric by-products. This is typical, of course, of organic reactions of this kind, and as is well known, organic reactions per se are characterized by the fact that 100% yields are the exception, rather than the rule, and that significant yields are satisfactory, especially in those instances where the by-products or cogeners may satisfactorily serve with the same purpose as the principal or intentional product. This is true in the present instance. In many cases when the compound is manufactured for purposes of demulsification, one is better off to obtain a polymer in the sense previously described, particularly a polymer whose molecular weight is a rather small multiple of the molecular weight of the monomer; for instance, a polymer whose molecule weight is two, three, four, five, or six times the molecular weight of the monomer. Polymerization is hastened by the presence of an alkali, and thus in instances where it is necessary to have a maximum yield of the monomer, it may be necessary to take such precautions that the alkali used in promoting oxyethylation of glycerol, be removed before subsequent reaction. This, of course, can be done in any simple manner by conversion to sodium chloride, sodium sulfate, or any suitable procedure.

In the preceding examples of the Completed monomeric derivative, Examples 1 to 10, inclusive, no reference is made to the elimination of such alkaline catalyst, in view of the effectiveness of the low multiple polymers as demulsifiers. Previous reference has been made to the fact that the carboxylic hydrogen atom might be variously replaced by substituents including organic radicals, for instance, the radicals obtained from alcohols, hydroxylated amines, non-hydroxylated amines, polyhydric alcohols, etc. Obviously, the reference is also true, in that a free hydroxyl group may be esterified with a selected acid, varying from such materials as ricinoleic acid to oleic acid, including alcohol acids, such as hydroxyacetic acid, lactic acid, ricinoleic acid and also polybasic acids of the kind herein contemplated.

With the above facts in mind, it becomes obvious that what has been previously said as to polymerization, with the suggestion that by-products or cogeneric materials were formed, may be recapitulated with greater definiteness, and one can readily appreciate that the formation of heat-rearranged derivatives or compounds must take place to a greater or lesser degree. Thus, the products herein contemplated may be characterized by being monomers of the type previously described, or esterification polymers, or the heat-rearranged derivatives of the same, and thus including the heat-rearranged derivatives of both the polymers and esterification monomers, separately and jointly. Although the class of materials specifically contemplated in this instance is a comparatively small and narrow class of a broad genus, yet it is obviously impossible to present any adequate formula which would contemplate the present series in their complete ramification, except in a manner employed in the hereto appended claims.

Although the products herein contemplated vary so broadly in their characteristics, i. e., monomers through sub-resinous polymers, soluble products, water-emulsifiable oils or compounds, hydrotropic materials, balsams, sub-resinous materials, semi-resinous materials, and the like, yet there is always present the characteristic unitary hydrophile structure related back to the oxyalkylation, particularly the oxyethylation of the glycerol used as the raw material. When our new product is used as a demulsifier in the resolution of oil field emulsions, the demulsifier may be added to the emulsion at the ratio of 1 part in 10,000, 1 part in 20,000, 1 part in 30,000, or for that matter, 1 part in 40,000. In such ratios it well may be that one cannot differentiate between the solubility of a compound completely soluble in water in any ratio, and a semi-resinous product apparently insoluble in water in ratios by which ordinary insoluble materials are characterized. However, at such ratios the importance must reside in interfacial position and the ability to usurp, preempt, or replace the interfacial position previously occupied perhaps by the emulsifying colloid. In any event, reviewed in this light, the obvious common property running through the entire series, notwithstanding variation in molecular size and physical makeup, is absolutely apparent. Such statement is an obvious oversimplification of the rationale underlying demulsification, and does not even consider the resistance of an interfacial film to crumbling, displacement, being forced into solution, altered wettability, and the like. As to amidification polymers, for instance, where Z is a polyamino amide radical, see what is said subsequently.

COMPLETED POLYMERIC DERIVATIVES INCLUDING HEAT-REARRANGED COGENERS

*Example 1*

A monomeric material of the kind described under the heading "Completed derivatives, Example 3," and obtained from a monoamino compound and an oxyethylated glycerol polymaleate, is heated at a temperature of approximately 220–240° C., with constant stirring, for a period of 2 to 60 hours, so as to eliminate sufficient water, in order to insure that the resultant product has a molecular weight approximately twice that of the initial isomer.

COMPLETED POLYMERIC DERIVATIVES INCLUDING HEAT-REARRANGED COGENERS

*Example 2*

The same procedure is followed as in the preceding example, except that polymerization is continued, using either a somewhat longer reaction time, or it may be, a somewhat higher temperature, or both, so as to obtain a material having a molecular weight of approximately three to four times that of the initial product.

COMPLETED POLYMERIC DERIVATIVES INCLUDING HEAT-REARRANGED COGENERS

*Example 3*

The same procedure is followed as in Examples 1 and 2, preceding, except that one employs as a reactant one of the polyamino ethers instead of one of the monoamino ethers.

COMPLETED POLYMERIC DERIVATIVES INCLUDING HEAT-REARRANGED COGENERS

*Example 4*

The same procedure is followed as in Examples 1 to 3, preceding, except that one polymerizes a mixture instead of a single monomer, for instance, a mixture of materials of the kind described in Completed monomeric derivative, Example 3, and in Completed monomeric derivative, Example 4, are mixed in molecular proportion and subjected to polymerization in the manner indicated in the previous examples.

It is understood, of course, that the polymerized product need not be obtained as a result of a two-step prcedure. In other words, one need not convert the reactants into the monomer and then subsequently convert the monomer into the polymer. The reactants may be converted through the monomer to the polymer in one step. Indeed, the formation of the monomer and polymerization may take place simultaneously. This is especially true if polymerization is conducted in the absence of a liquid such as xylene, as previously described, and if one uses a comparatively higher temperature, for instance, approximately 200° C. for polymerization. Thus, one pound mole of oxyethylated glycerol polymaleate of the kind described is mixed with one pound mole of the polyhydroxylated diaminoether obtained by reacting ricinoleic acid with an amine of the following composition:

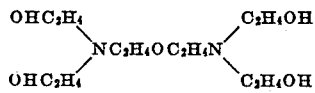

Such mixture is reacted for approximately 20 hours at about 200° C. until the mass is homogeneous. It is stirred constantly during reaction. Polyfunctionality may reside in dehydration (etherization) of two hydroxyl groups attached to dissimilar molecules.

The fact that the polymerized and heat-rearranged products can be made in a single step, illustrates a phenomenon which sometimes occurs either in such instances where alcoholic bodies of the kind herein illustrated are contemplated as reactants, or where somewhat kindred alcoholic bodies are employed. The reactants may be mixed mechanically to give a homogeneous mixture, or if the reactants do not mix to give a homogeneous mixture, then early in the reaction stage there is formed, to a greater or lesser degree, sufficient monomeric materials so that a homogeneous system is present. Subsequently, as reaction continues, the system may become heterogenous and exist in two distinct phases, one being possibly an oily body of moderate viscosity, and the other being a heavier material, which is sticky or sub-resinous in nature. In many instances, it will be found that the thinner liquid material is a monomer and the more viscous or resinous material is a polymer, as previously described. Such product can be used for demulsification by adding a solvent which will mutually dissolve the two materials, or else, by separating the two heterogeneous phases and employing each as if it were a separate product of reaction.

Materials of the kind herein contemplated may find uses as wetting, detergent, and leveling agents in the laundry, textile, and dyeing industry; as wetting agents and detergents in the acid washing of fruit, in the acid washing of building stone and brick; as a wetting agent and spreader in the application of asphalt in road building and the like, as a constituent of soldering flux preparations; as a flotation reagent in the flotation separation of various minerals; for flocculation and coagulation of various aqueous suspensions containing negatively charged particles such as sewage, coal washing waste water, and various trade wastes and the like; as germicides, insecticides, emulsifiers for cosmetics, spray oils, water-repellent textile finish, etc. These uses are by no means exhaustive.

However, the most important phase of the present invention, as far as industrial application goes, is concerned with the use of the materials previously described as demulsifiers for water-in-oil emulsions, and more specifically, emulsions of water or brine in crude petroleum.

We have found that the particular chemical compounds or reagents herein described may also be used for other purposes, for instance, as a break inducer in doctor treatment of the kind intended to sweeten gasoline. (See U. S. Patent No. 2,157,223, dated May 9, 1939, to Sutton.)

Chemical compounds of the kind herein described are also of value as surface tension depressants in the acidization of calcareous oil-bearing strata by means of strong mineral acid, such as hydrochloric acid. Similarly, some members are effective as surface tension depressants or wetting agents in the flooding of exhausted oil-bearing strata.

As to using compounds of the kind herein described as flooding agents for recovering oil from subterranean strata, reference is made to the procedure described in detail in U. S. Patent No. 2,226,119, dated December 24, 1940, to De Groote and Keiser. As to using compounds of the kind herein described as demulsifiers, or in particular as surface tension depressants in combination with mineral acid or acidization of oil-bearing strata, reference is made to U. S. Patent No. 2,233,383, dated February 25, 1941, to De Groote and Keiser.

Cognizance must be taken of the fact that the surface of the reacting vessel may increase or decrease reaction rate and degree of polymerization, for instance, an iron reaction vessel speeds up reaction and polymerization, compared with a glass-lined vessel.

As has been previously indicated, the sub-genus employed as an alcohol in the present instance is one of a series of alcoholic compounds which are contemplated in our co-pending applications Serial Nos. 497,118, 497,119, 497,120, 497,121, 497,122, 497,123, 497,124, 497,125, 497,126, 497,128, 497,129, 497,130, 497,131, 497,132, 497,133, 497,134, and 497,135, all filed August 2, 1943.

Having thus described our invention, what we claim as new and desire to secure by Letters Patent is:

1. A member of the class consisting of sub-resinous ester-linked acylated derivative of a basic polyamino ether alcohol having at least 2 basic amino nitrogen atoms linked by the divalent ether radical —R—O—R—, of the following formula:

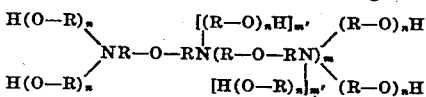

in which at least one oxygen-linked reactive hydrogen atom has been substituted by R₂COO which represents the acyloxy radical of a monocarboxy detergent-forming acid having at least 8 and not more than 32 carbon atoms; and R—O represents an alkylene oxide radical selected from the class consisting of ethylene oxide radicals, propylene oxide radicals, butylene oxide radicals, and glycid radicals, and in which R represents the corresponding alkylene radical thereof; $n$ is a small whole number less than 5, and $m$ is a small numeral less than 5 and including zero; $m'$ is a numeral not over one and including zero, with the proviso that $m'$ must be zero if the amino nitrogen atom to which the monovalent radical $$[—(R—O)_nH]_{m'}$$

is attached is a terminal nitrogen atom and otherwise $m'$ must be one; the acyl group substituted for a reactive oxygen-linked hydrogen atom of said acylated polyamino ether radical being the acyl radical of an acidic fractional ester of the formula:

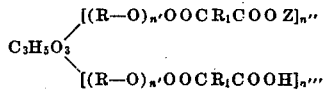

in which —$OCR_1CO$— is the acyl radical of a polycarboxy acid having not over 8 carbon atoms; Z represents a metallic cation; R—O is a member of the class consisting of ethylene oxide radicals, propylene oxide radicals, butylene oxide radicals and glycid radicals, and $n'$ represents a numeral varying from 3 to 10, and $n''$ represents a numeral varying from 0 to 2, and $n'''$ represents a numeral varying from 1 to 3, with the proviso that the sum of $n''+n''' = 3$.

2. The ester of claim 1, wherein $m$ is less than 2.

3. The ester of claim 1, wherein $m$ is less than 2 and $n$ is one.

4. The ester of claim 1, wherein $m$ is less than 2, $n$ is one, and $R_2COO$ is the acyloxy radical of a higher fatty acid having 18 carbon atoms.

5. The ester of claim 1, wherein $m$ is less than 2, $n$ is one, and $R_2COO$ is the acyloxy radical of a higher fatty acid having 18 carbon atoms and at least one ethylene linkage.

6. The ester of claim 1, wherein $m$ is less than 2, $n$ is one, $R_2COO$ is the acyloxy radical of a higher fatty acid having 18 carbon atoms and at least one ethylene linkage, and R is an ethylene radical.

7. The ester of claim 1, wherein $m$ is less than 2, $n$ is one, $R_2COO$ is the acyloxy radical of a higher fatty acid having 18 carbon atoms and at least one ethylene linkage, R is an ethylene radical, and the polycarboxy acid is dicarboxy.

8. The ester of claim 1, wherein $m$ is less than 2, $n$ is one, $R_2COO$ is the acyloxy radical of a higher fatty acid having 18 carbon atoms and at least one ethylene linkage, R is an ethylene radical, the polycarboxy acid is dicarboxy, and —$OCR_1CO$— is a maleic acid radical.

9. The ester of claim 1, wherein $m$ is less than 2, $n$ is one, $R_2COO$ is the acyloxy radical of a higher fatty acid having 18 carbon atoms and at least one ethylene linkage, R is an ethylene radical, the polycarboxy acid is dicarboxy, and —$OCR_1CO$— is a phthalic acid radical.

10. The ester of claim 1, wherein $m$ is less than 2, $n$ is one, $R_2COO$ is the acyloxy radical of a higher fatty acid having 18 carbon atoms and at least one ethylene linkage, R is an ethylene radical, the polycarboxy acid is dicarboxy, and —$OCR_1CO$— is an adipic acid radical.

11. The method of manufacturing esters described in claim 1, which consists in reacting: (A) A basic polyamino ether alcohol having at least 2 basic amino nitrogen atoms linked by the divalent ether radical —R—O—R—, of the following formula:

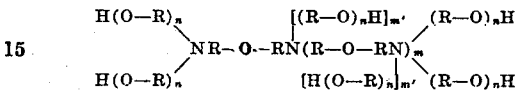

in which at least one oxygen-linked reactive hydrogen atom has been substituted by $R_2COO$ which represents the acyloxy radical of a monocarboxy detergent-forming acid having at least 8 and not more than 32 carbon atoms; and R—O represents an alkylene oxide radical selected from the class consisting of ethylene oxide radicals, propylene oxide radicals, butylene oxide radicals, and glycid radicals, and in which R represents the corresponding alkylene radical thereof; $n$ is a small whole number less than 5, and $m$ is a small numeral less than 5 and including zero; $m'$ is a numeral not over one and including zero, with the proviso that $m'$ must be zero if the amino nitrogen atom to which the monovalent radical:

$$[(R—O)_nH]_{m'}$$

is attached is a terminal nitrogen atom and otherwise $m'$ must be one; with (B) An acidic fractional ester of the formula:

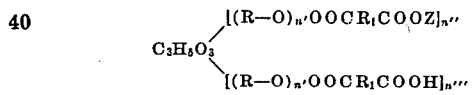

in which —$OCR_1CO$— is the acyl radical of a polycarboxy acid having not over 8 carbon atoms; Z represents a metallic cation; R—O is a member of the class consisting of ethylene oxide radicals, propylene oxide radicals, butylene oxide radicals, and glycid radicals, and $n'$ represents a numeral varying from 3 to 10, and $n''$ represents a numeral varying from 0 to 2, and $n'''$ represents a numeral varying from 1 to 3, with the proviso that the sum of $n''+n'''=3$.

MELVIN DE GROOTE.
BERNHARD KEISER.